(No Model.) 2 Sheets—Sheet 2.

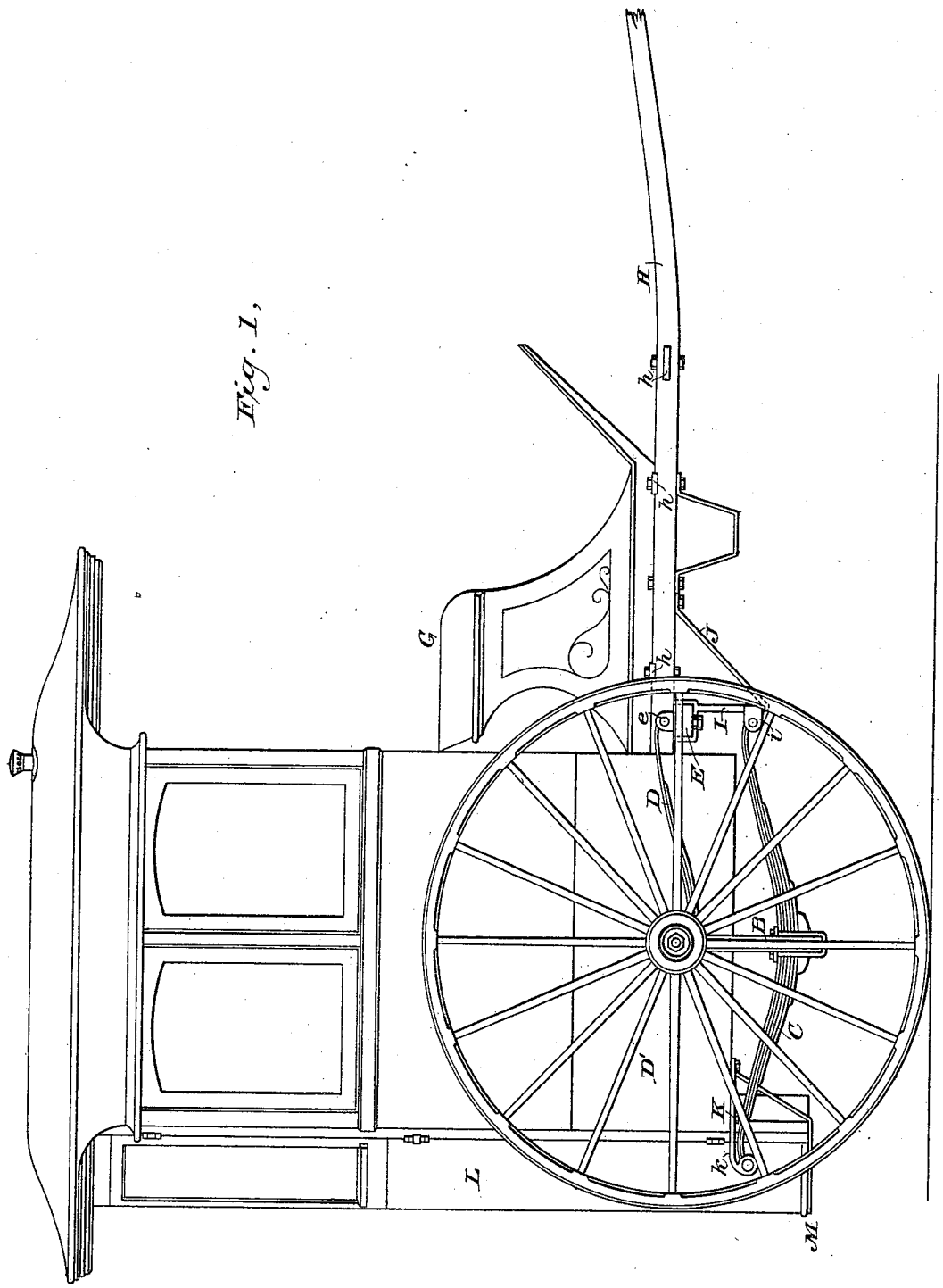

P. HERDIC.
Two Wheeled Vehicle.

No. 242,318. Patented May 31, 1881.

WITNESSES
Wm. A. Skinkle
Geo. W. Beck.

By his Attorneys
Baldwin, Hopkins & Peyton.

INVENTOR
Peter Herdic,

N. PETERS, Photo-Lithographer, Washington, D. C.

UNITED STATES PATENT OFFICE.

PETER HERDIC, OF PHILADELPHIA, PENNSYLVANIA.

TWO-WHEELED VEHICLE.

SPECIFICATION forming part of Letters Patent No. 242,318, dated May 31, 1881.

Application filed February 19, 1881. (No model.)

*To all whom it may concern:*

Be it known that I, PETER HERDIC, of the city of Philadelphia, in the State of Pennsylvania, have invented certain new and useful Improvements in Two-Wheeled Vehicles, of which the following is a specification.

My invention relates to improvements in two-wheeled vehicles the bodies of which are supported by springs upon cranked axles, and especially to passenger vehicles or cabs of this class.

My improvements pertain to the springs, the manner of mounting the vehicle-body upon them, and the manner of connecting the axle, the springs, the body, and the shafts, whereby a strong, light, easy-running vehicle is produced.

The subject claimed will hereinafter be designated, after first fully describing my improvements in connection with the accompanying drawings, in which—

Figure 3:
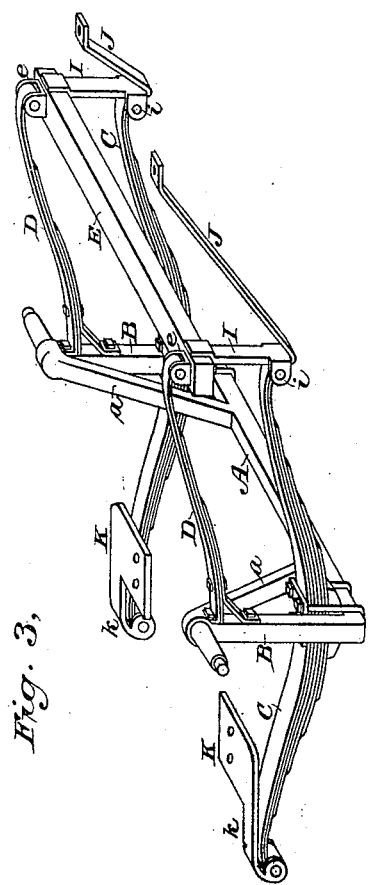
Figure 2:
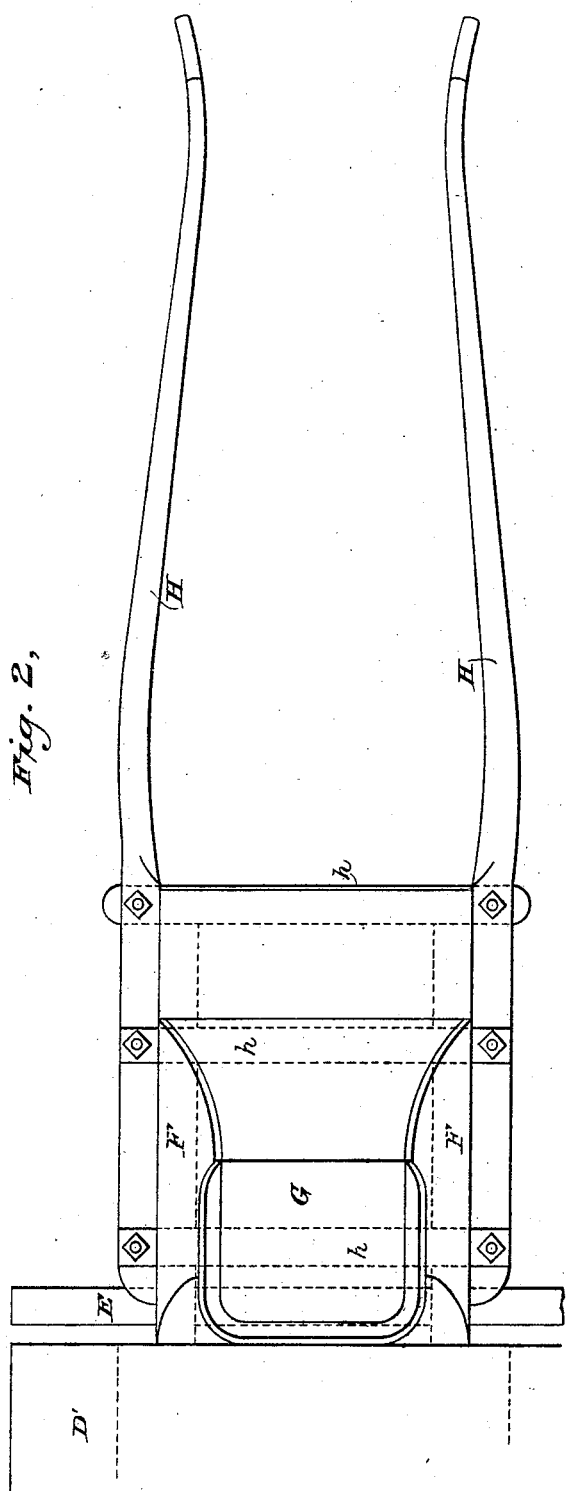

Figure 1 is a side elevation of a four-passenger vehicle, the shafts being in part broken away. Fig. 2 is a plan or top view, showing the shafts, driver's seat, and a portion of the front of the body. Fig. 3 is a view, in perspective, of the running-gear, or the axle, springs, &c.

A cranked axle, A, (shown as provided with struts or braces a a, for strengthening its upright ends or cranks B B,) is made of any suitable material or materials—for instance, as shown and described in United States Letters Patent granted to me April 20, 1880, No. 226,748. Body-supporting or main springs C C are clipped or firmly connected midway their lengths to the axle near its cranks. Bracing-springs D D, above the main springs, are rigidly connected at their rear ends to the cranks B B. Bar-braces may be used.

To the extent above described the axle and springs employed in my present invention are the same as, or substantially similar to, the corresponding parts shown and described in my application for Letters Patent of the United States filed simultaneously herewith, and entitled "Improvements in Vehicles," said application relating to improvements expressly applicable to four-wheeled vehicles. In so far as there may be any similarity between features of this invention and devices or combinations of parts shown in my said application, such features or combinations are not herein claimed.

The bracing-springs D D have pivoted connection at their front ends with the bed or body D' of the vehicle, in this instance through or by way of a cross-bar, E, securely fastened to the under side of the front projecting frame-bars, F F, of the body-skeleton or frame-work. This cross-bar E or its equivalent—such, for instance, as a suitable bracket or brackets—might be attached directly to the vehicle-body low down at front, or both to the frame-bars and body. These frame-bars F F extend forward to support the driver's seat G and dash-board, and have the shafts H secured to them at their sides or edges in suitable way, as by the cross bars or braces h h h of the framing F F, and bolts and nuts, as plainly shown in the drawings. Each spring D connects with its projecting end of the cross-bar E by a lug, e, and pin or bolt. When brace-bars are employed they are jointed at both ends.

The main springs C C have jointed connection at their front ends with the vehicle-body by rigid hangers or firmly-secured pendent brackets I I, fastened to the ends of the cross-bar E. Lugs i i at the lower ends of these brackets serve to joint to them the front ends of the main supporting-springs. Braces J J connect the brackets with the shafts, or, if preferred, with the bars F F. Each bracket is shown as formed in one piece with its diagonal brace J, and as provided at top with lips or flanges to embrace the vertical edges of the cross-bar, to which it is secured by the bolt which fastens the lug e in place. Each main spring C has jointed connection at its rear end with the vehicle-body by way of broad brackets or plates K K, securely fastened to the bed or bottom of the vehicle-body. Rearwardly-projecting narrow portions or arms k k of these brackets connect by pins or bolts with the ends of the springs C C. A single cross bracket, plate, or bar might be substituted for the brackets K K.

Vehicles designed for passengers, and constructed in accordance with this invention, may have any suitable number of seats—say two to six, inclusive—and the seats may be arranged crosswise of the vehicle, though they are, as in this instance, preferably arranged longitudinally, with a space or passage-way between the rows.

The vehicle is provided with a suitable rear step, M, and a door or doors, L, preferably controllable by the driver. Such doors and steps are shown in applications for Letters Patent of the United States filed by me January 17, 1881, and need not therefore be herein particularly described.

Various modifications may be made in my improvements without departure from my invention. For instance, the shafts, instead of being fixedly connected with the seat-platform or projecting front frame-bars of the vehicle-body, may be rigidly but removably secured in place. Any suitable kind of vehicle body or bed may be employed. Instead of the particularly-described pivotal connections between the front ends of the two sets of springs C D, C D, a double cross-head bar may be substituted for the cross-bar E, and the bar or rod braces or bracing-springs and main springs be pivoted respectively to the upper and to the lower arms of the cross-head at the ends of the double cross-head bar, said bar being firmly connected in place, intermediate its cross-head ends, in the same way that bar E is secured.

I claim as of my own invention—

1. The combination, substantially as hereinbefore set forth, of the vehicle-body, the shafts, the cranked axle, the main springs secured to the axle and having pivoted connection at both ends with the vehicle-body, and the bracing-springs, or their specified equivalents, secured at their rear ends to the axle-cranks, and having pivotal connection at their front ends with the vehicle-body.

2. The described running-gear for two-wheeled vehicles, consisting, essentially, of the combination of the cranked axle, the main springs secured thereto at or about their middles, the braces or bracing-springs located above the main springs, and secured at their rear ends to the axle-cranks, the cross-bar with which the front ends of both sets of springs have pivotal connection, and the bracket or brackets to which the rear ends of the main springs are jointed.

3. The combination, substantially as hereinbefore set forth, of the cranked axle, the main springs, the braces or bracing-springs, the cross-bar to which the braces or bracing-springs are jointed at their front ends, and the pendent brackets secured to said bar, and to the lower ends of which the main springs are jointed, for the purpose described.

4. The combination of the vehicle-body, the shafts, the cross-bar, and the braced pendent brackets, substantially as and for the purpose hereinbefore set forth.

5. The hereinbefore-described two-wheeled passenger-vehicle, consisting of the body, the cranked axle, the main springs secured about midway their lengths to the axle, and having pivotal connection at their front and rear ends with the body, the bracing-springs rigidly connected at their rear ends with the axle-cranks, located above the main springs, and having pivotal connection at front with the body, the shafts, the driver's seat, and the rear door or doors, all substantially as hereinbefore set forth.

In testimony whereof I have hereunto subscribed my name.

P. HERDIC.

Witnesses:
WM. J. PEYTON,
CHAS. E. UPPERMAN.